United States Patent [19]

Hori

[11] Patent Number: 5,091,740
[45] Date of Patent: Feb. 25, 1992

[54] FILM WINDING DEVICE

[75] Inventor: Masakatsu Hori, Tokyo, Japan

[73] Assignee: Asahi Kogaku Kogyo Kabushiki Kaisha, Tokyo, Japan

[21] Appl. No.: 680,622

[22] Filed: Mar. 28, 1991

Related U.S. Application Data

[63] Continuation of Ser. No. 417,016, Oct. 4, 1989, abandoned.

[30] Foreign Application Priority Data

Oct. 4, 1988 [JP] Japan .................. 63-130183

[51] Int. Cl.$^5$ .................. G03B 1/18; G03B 1/12
[52] U.S. Cl. .................. 354/173.1; 354/214
[58] Field of Search .................. 354/173.1, 212, 213, 354/214, 71.6

[56] References Cited

U.S. PATENT DOCUMENTS

| Re. 30,178 | 12/1979 | Faught | 354/213 |
| 3,948,456 | 4/1976 | Shimizu | 242/71.4 |
| 3,994,003 | 11/1976 | Iwashita et al. | 354/173 |
| 4,400,074 | 8/1983 | Akiyama et al. | 354/173 |
| 4,416,525 | 11/1983 | Chan | 354/214 X |
| 4,544,251 | 10/1985 | Haraguchi et al. | 354/288 |

FOREIGN PATENT DOCUMENTS

| 0822010 | 1/1984 | Fed. Rep. of Germany . |
| 56-038102 | 4/1981 | Japan . |
| 2171809 | 3/1986 | United Kingdom . |

OTHER PUBLICATIONS

Richter et al., "Bauelemente Ter Feninmechanik", (Building Elements for Precise Mechanisms), EDI-Derlag, GmbH, Berlin NW7, 1929, pp. 389-394.
English Language Abstract of Japanese 56-38, 102.

Primary Examiner—Russell E. Adams
Assistant Examiner—Joe N. Noh
Attorney, Agent, or Firm—Sandler, Greenblum, & Bernstein

[57] ABSTRACT

A film winding device for a camera is provided in which a drive motor is housed in a film winding spool, and an output shaft of the drive motor projects from the film winding spool. A reduction mechanism is provided between the output shaft and the film winding spool to rotate the film winding spool and to thus wind film thereon. The reduction mechanism comprises a parent gear rotating with the output shaft, a planet gear provided at a position offset from the center of the parent gear, a stationary gear fixed to a camera body, and a rotational gear connected to the film winding device. The stationary gear and the rotational gear are coaxial with the parent gear and mesh with the planet gear. The rotational gear rotates relative to the stationary gear, so that the planet gear is rotated at a rotational speed dependent on the difference between the number of teeth of the stationary gear and the number of teeth of the rotational gear.

12 Claims, 2 Drawing Sheets

FILM WINDING DEVICE

This application is a continuation of application Ser. No. 07/417,016, filed Oct. 4, 1989, now abandoned.

BACKGROUND OF THE INVENTION

1. Field of the Invention

The present invention relates to a film winding device in which rotation of a winding motor housed in a film winding spool is transmitted to a winding spool through a reduction mechanism. In particular, the present invention relates to the reduction mechanism of such a film winding device.

2. Description of the Related Art

Due to the current trend toward a miniaturization of cameras, in film winding mechanisms of such cameras, the drive motor is usually housed in the film winding spool. Conventionally, in this kind of device, an output shaft of the drive motor projects from the winding spool and is provided with a drive gear, and rotation of the drive gear is transmitted to the winding spool through a reduction mechanism in order to wind the film on to the winding spool. Conversely, when the film is to be rewound, rotation of the drive motor is reversed and is transmitted to a rewinding shaft through rotation switching mechanism, whereby a rotation of a shaft of a film cartridge is reversed, and the film wound onto the winding spool is rewound into the film cartridge.

In this conventional device, the reduction mechanism is used to reduce the rotational speed of the driver motor, and to transmit the reduced rotational speed of the drive motor to the winding spool. Conventional reduction mechanisms comprise a gear train including a plurality of gears having a different number of teeth. Therefore, the size of the reduction mechanism is relatively large; and this is a disadvantage when attempting to reduce the size of a camera. Further, since conventional reduction mechanisms have many parts, the manufacturing and assembly costs are high.

SUMMARY OF THE INVENTION

Therefore, one object of the present invention is to provide a film winding device in which a reduction mechanism including a drive motor and a winding spool comprising of a small number of parts, so that the size of the reduction mechanism will be reduced and the structure thereof simplifieds and, further so that, the mechanism will provide a high reduction ratio.

According to the present invention, a film winding device for a camera is provided including a winding spool rotably supported by a camera body, and a drive motor housed in the winding spool in such a manner that an output shaft of the drive motor projects from the winding spool, with the output shaft being connected to the winding spool through a reduction mechanism through which the winding spool is rotated to wind film thereon. The film winding device comprises a parent gear, a planet gear, a stationary gear, a rotational gear, and means for transmitting rotation of the rotational gear to the winding spool to wind film thereon.

In the reduction mechanism according to the present invention, the parent gear rotates in association with the output shaft, the planet gear is provided at a position offset from the center of the parent gear, the stationary gear is provided coaxially with the parent gear and is meshed with the planet gear, and the rotational gear is provided coaxially with the parent gear and meshed with the planet gear. The rotational gear is rotatable relative to the stationary gear, and the number of gear teeth of the rotational gear is different from that of the stationary gear.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
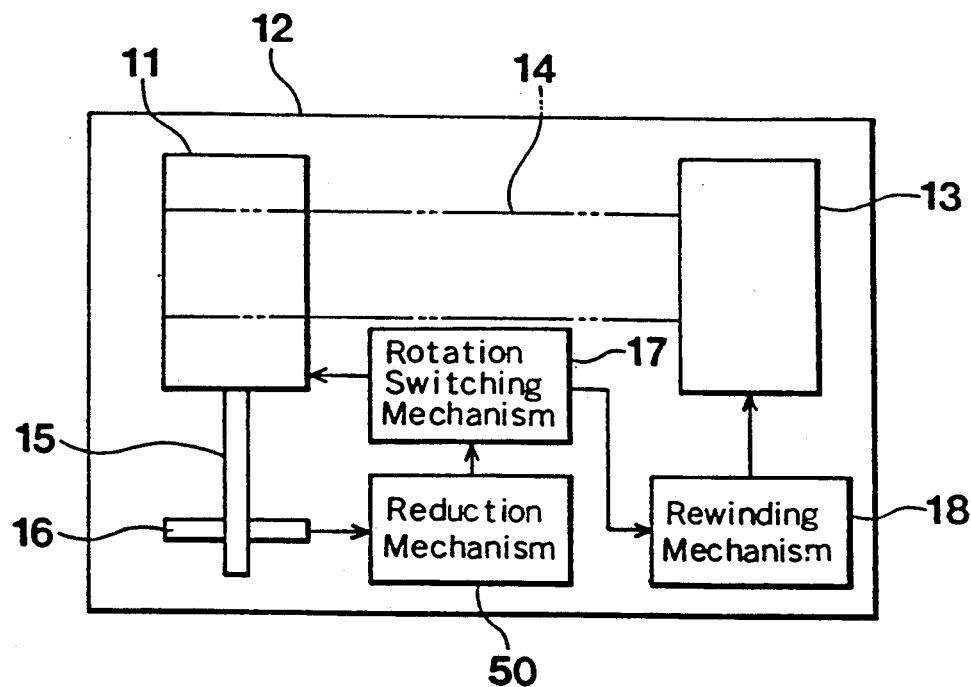
FIG. 1 shows a schematic diagram of a structure for winding and rewinding film in a camera.

The present invention will now be described with reference to embodiments shown in the drawings.

FIG. 1 shows a schematic diagram of structure by which a film in a camera is wound and rewound, wherein a winding spool 11 is provided in a camera 12 in such a manner that the winding spool 11 is rotated about the axis thereof. A film cartridge 13, including film 14, is also accommodated in camera 12, and the film 14 is fed from the film cartridge 13 and extended to the winding spool 11, to be wound around the winding spool 11. A drive motor (not shown) is housed in the winding spool 11 in such a manner that an output shaft 15 of the drive motor projects from the winding spool 11. This output shaft 15 of the drive motor is provided with a drive gear 16 connected to a reduction mechanism 50, and the reduction mechanism 50 is connected to a rotation switching mechanism 17 which selectively transmits rotation of the reduction mechanism 50 to the winding spool 11 or to a rewinding mechanism 18 connected to a rotational shaft of the film cartridge 13. Accordingly when the winding spool 11 is rotated, the film 14 is pulled out from the film cartridge 13 and wound around the winding spool 11, and when the rotational shaft of the film cartridge 13 is rotated, the film 14 is rewound into the film cartridge 13.

Figure 2:
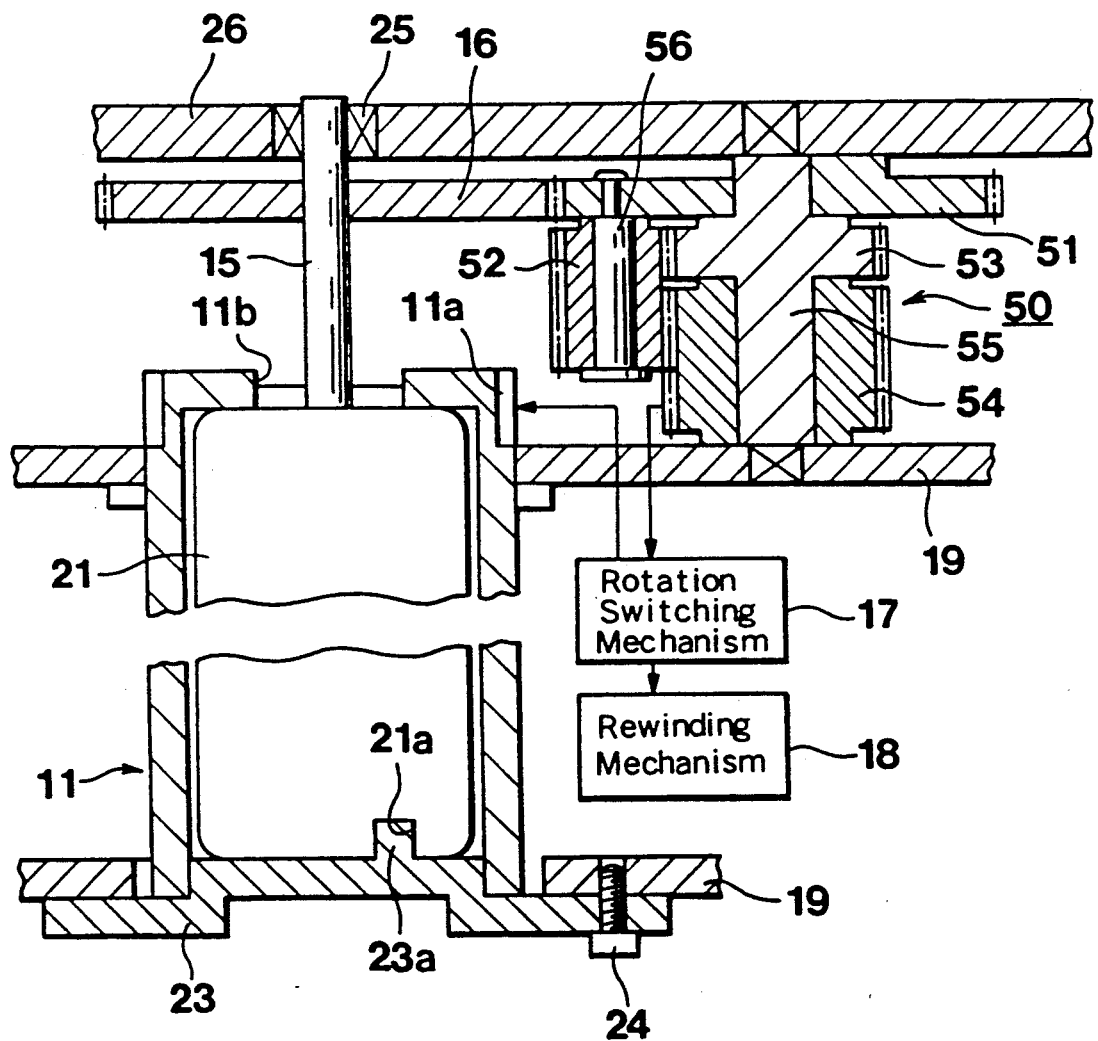
FIG. 2 is a sectional view of a main part of an embodiment of the present invention.

Thus, rotation mechanism 17, as clearly illustrated in FIG. 2, serves to transmit rotation of the rotational gear to the winding spool to wind film thereon, as indicated in the preceding paragraph; and, as is also indicated above, rotation switching mechanism 17 selectively transmits rotation of reduction mechanism 50 to either winding spool 11 or to rewinding mechanism 18, which is connected to a rotatable shaft of film cartridge 13.

FIG. 2 shows a construction of the winding spool 11 and the reduction mechanism 50 according to the present invention.

The winding spool 11 has a cylindrical shape and is rotatably supported by a camera body 19, and has a spool gear 11a formed on an outer surface thereof. A drive motor 21 is housed in the winding spool 11, and the output shaft 15 of the drive motor 21 extends through a hole 11b formed in the winding spool 11, so as to project therefrom. The drive motor 21 is supported by a support plate 23 fixed to the camera body 19 by a connecting screw 24. This support plate 23 is provided with a projection 23a extending into the winding spool 11, and the drive motor 21 is provided with a recess 21a which fits over the projection 23a, at a position offset from the center of the drive motor 21, so that the drive motor 21 is fixed in the winding spool 11 in such a manner that rotation about the axis spool is prevented.

A tip portion of the output shaft 15 is rotatably supported by a bearing 25 mounted in a parent plate 26 which is rigidly connected to the camera body 19, and a drive gear 16 is fixed to the output shaft 15.

The reduction mechanism 50 is disposed between the parent plate 26 and the camera body 19, and comprises a parent gear 51, a planet gear 52, a stationary gear 53, and a rotational gear 54, by which the number of rotations of the drive gear 16 is reduced and transmitted to the winding spool 11 or the rewinding mechanism 18.

The stationary gear 53 has a shaft member 55 extending between the parent plate 26 and the camera body 19, in parallel to the output shaft 15 of the drive motor 21. The end portions of the shaft member 55 are connected to the parent plate 26 and the camera body 19, respectively, whereby the shaft member 55 is fixed in such a manner that it cannot rotate about its own axis. The parent gear 51 is rotatably fitted to an upper portion of the shaft member 55 and is meshed with the drive gear 16. The stationary gear 53 is integrally formed with the shaft member 55 at an intermediate portion thereof, namely, the stationary gear 53 cannot rotate relative to the parent plate 26 and the camera body 19. It should be noted that the stationary gear 53 is coaxial with the parent gear 51, and has a diameter smaller than that of the parent gear 51.

The rotational gear 54 is coaxial with the parent gear 51, and is fitted to a lower portion of the shaft member 55 so that it is rotatable relative to the stationary gear 53. The stationary gear 53 and the rotational gear 54 have substantially the same diameter, respectively, but the number of teeth of the rotational gear 54 is different from that of the stationary gear 53. Note, although the number of teeth of the rotational gear 54 is larger than that of the stationary gear 53 in this embodiment, the number of teeth of the rotational gear 54 may be smaller than that of the stationary gear 53 in another embodiment.

Figure 3:
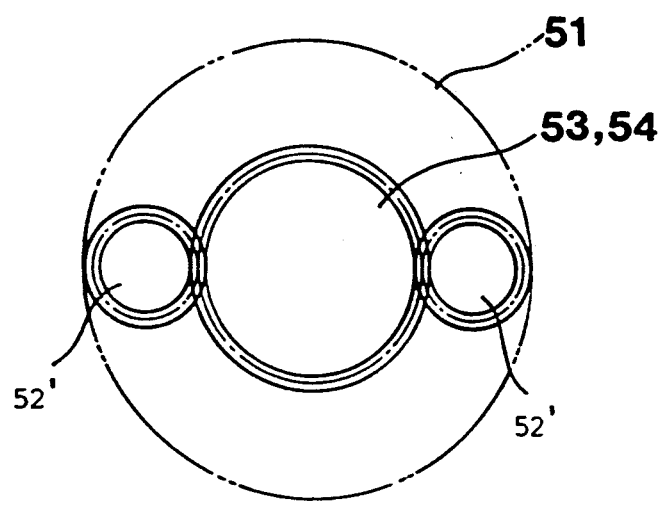
FIG. 3 is a plan view of a stationary gear and planet gears.

The planet gear 52 is provided at a position offset from the center of the parent gear 51, and a pin 56 is connected to a peripheral portion of the parent gear 51 so that the planet gear 52 is rotatably supported by the parent gear 51 through the pin 56. Although a single planet gear 52 is shown in FIG. 2, two planet gears 52' may be provided in another embodiment, as shown in FIG. 3, in which the planet gears 52' are positioned on opposite sides of the stationary gear 53 and the rotational gear 54.

The stationary gear 53 and the rotational gear 54 are in mesh with the planet gear 52, and therefore, when the parent gear 51 is rotated, the planet gear 52 revolves around the stationary gear 53 and rotates about the pin 56, so that the rotational gear 54 rotates about the shaft member 55. The rotation speed of the rotational gear 54 depends upon the difference in the number of teeth of the stationary gear 53 and the rotational gear 54. The rotation of the rotational gear 54 is transmitted to the winding spool 11 or the rewinding mechanism 18 through the rotation switching mechanism 17, by a meshing of a gear (not shown) of the rotation switching mechanism 17 with the spool gear 11a or a gear of rewinding mechanism 18.

The device described in the above embodiment operates as follows.

When the drive motor 21 is rotated, the drive gear 16 on the output shaft 15 is rotated, and this rotation of drive gear 16 is transmitted to parent gear 51. As a result, the planet gear 52 connected to a peripheral portion of the parent 51 revolves round the stationary gear 53, as a sun gear, and rotates about the pin 56. As the planet gear 52 meshes with the stationary gear 53 and the rotational gear 54, which each have a different number of teeth, gears 52, 53 and 54 together operate as a differential gear, so that rotational gear 54 is slowly rotated at a rotation speed which depends upon the difference between the number of teeth of the stationary gear 53 and of the rotational gear 54. When winding film, rotation of the rotational gear 54 is transmitted to the winding spool 11 through the rotation switching mechanism 17 and the spool gear 11a. Conversely, when rewinding the film, the rotation of the rotational gear 54 is transmitted to the rewinding mechanism 18 through the rotation switching mechanism 17.

Assuming that the number of teeth of the rotational gear 54 is $Z_r$ and the number of teeth of the stationary gear 53 is $Z_s$, and further, that $Z_r$ is larger than $Z_s$, then the ratio of the number of rotations $N_1$; of the output shaft 15 of the drive motor 21 and the number of rotations $N_2$ of the winding spool 11 is obtained by the following equation. It should be noted that the rotation switching mechanism 17 does not reduce the rotation speed of the rotational gear 54.

$$N_1/N_2 = Z_d/Z_p \times (Z_r - Z_s)/Z_r \times Z_r/Z_g$$
$$= Z_d(Z_r - Z_s)/(Z_p \cdot Z_g)$$

wherein $Z_d$ denotes the number of teeth of the drive gear 16, $Z_p$ denotes the number of teeth of the parent gear 51, and $Z_g$ denotes the number of teeth of the spool gear 11a.

As understood from the above equation, the smaller the difference in the number of teeth denoted by $Z_s$ and $Z_r$, the larger the reduction ratio. When the difference in the number of teeth denoted by $Z_s$ and $Z_r$ is "n", the number of planet gears 52 provided can either be "n" or a multiple of "n" in order to obtain a good meshing performance. In other words, the number of planet gears 52 is equal to, or a multiple of, the difference between the number of teeth in the stationary gear 53 and in the rotational gear 54 used to obtain a desirably high reduction ratio. The use of a multiple of "n" as the number of planet gears is preferable to using "n" gears. Note that, when the difference in the number of teeth of the gears 53 and 54 is 1, by taking into consideration deviations in the parent gear 51 due to meshing thereof with the planet gear 52, a pair of planet gears 54 may be provided around the stationary gear 53 and the rotational gear 54 at a spacing of 180 degrees from each other, as shown in FIG. 3.

Note that, if the number of teeth of the rotational gear 54 is smaller than that of the stationary gear 53, the direction of rotation of the rotational gear 53 is the reverse of that given in the above description.

As described above, film winding devices according to the present invention have a simple construction and require a relatively small space when mounted in a camera. Therefore, these film winding devices allow reduction of the size of a camera, and further, since the number of parts required for the devices is reduced, the manufacturing and assembly costs are correspondingly lowered.

Although the embodiments of the present invention have been described herein with reference to the accompanying drawings, obviously many modifications and changes may be made by those skilled in this art without departing from the scope of the invention.

I claim:

1. A film winding device for a camera, said camera including a winding spool rotatably supported by a camera body and a drive motor housed in said winding spool in such a manner that an output shaft of said drive motor projects from said winding spool, said output shaft being connected to said winding spool through a reduction mechanism by which said winding spool is rotated to wind a film therearound, said film winding device comprising:
   a parent gear rotating in association with said output shaft;
   a planet gear provided at a position offset from the center of said parent gear;
   a non-rotatable stationary gear coaxial with said parent gear and meshed with said planet gear;
   a rotational gear coaxial with said parent gear and meshed with said planet gear, said rotational gear being rotatable relative to said stationary gear, and a number of teeth of said rotational gear being different from a number of teeth of said stationary gear; and,
   a means for transmitting a rotation of said rotational gear to said winding spool to wind a film thereon.

2. A film winding device according to claim 1, wherein said stationary gear is provided with a shaft member to which said parent gear is rotatably fitted.

3. A film winding device according to claim 1, wherein said stationary gear is provided with a shaft member to which said rotational gear is rotatably fitted.

4. A film winding device according to claim 1, wherein said planet gear is rotatably supported by said parent gear in such a manner that the center of said planet gear is offset from the center of said parent gear.

5. A film winding device according to claim 1, wherein the number of teeth of said rotational gear is larger than the number of teeth of said stationary gear.

6. A film winding device according to claim 1, wherein the number of teeth of said rotational gear is smaller than the number of teeth of said stationary gear.

7. A film winding device according to claim 1, wherein the number of said planet gears is equal to a multiple of the difference in the number of teeth of said rotational gear and the number of teeth of said stationary gear.

8. A film winding device according to claim 7, wherein the number of said planet gears is equal to the difference in the number of teeth of said rotational gear and the number of teeth of said stationary gear.

9. A film winding device according to claim 7, wherein the difference in the number of teeth of said stationary gear and the number of teeth of said rotational gear is 1, and wherein a pair of said planet gears are provided around said stationary gear and said rotational gear at a spacing of 180 degrees from each other.

10. A film winding device for a camera, said camera including a winding spool rotatably supported by a camera body and a drive motor housed within said winding spool such that an output shaft of said drive motor projects from said winding spool, said output shaft being connected to said winding spool via a reduction mechanism by which the winding spool is rotated to wind film on said spool, said film winding device comprising a parent gear which is rotatable in association with said output shaft, a planet gear located at a position which is offset from the center of said parent gear, a non-rotatable stationary gear which is coaxial with said parent gear and which is meshed with said planet gear, a rotational gear which is coaxial with said parent gear and which is meshed with said planet gear, said rotational gear being rotatable relative to said stationary gear, wherein each of said rotational gear and said stationary gear have a plurality of teeth, the number of teeth of said rotational gear being different from the number of teeth of said stationary gear, said film winding device further comprising a switching mechanism for selectively transmitting rotation of said rotational gear to said winding spool or to a film rewinding mechanism of said camera.

11. A film winding device according to claim 1, wherein said stationary gear includes a stationary shaft formed integrally with said stationary gear, said stationary shaft being fixedly connected to said camera body.

12. A film winding device for a camera, said camera including a winding spool rotatably supported by a camera body, a drive motor housed in the camera body and having an output shaft, said output shaft being connected to said winding spool though a reduction mechanism by which said winding spool is rotated to wind a film therearound, said film winding device comprising:
   a parent gear rotating in association with said output shaft;
   a planet gear provided at a position offset from a center of said parent gear;
   a stationary gear, coaxial with said parent gear and meshing with said planet gear, said stationary gear including a shaft formed integrally with said stationary gear, and fixedly connected to the camera body;
   a rotational gear, meshed with said planet gear, said rotational gear being rotatable relative to said stationary gear; and
   means for transmitting rotation of said rotational gear to said winding spool to wind a film thereon.

* * * * *